2,756,262

DEHYDRATION OF DIMETHYL PHENYL CARBINOLS

George G. Joris, Madison, N. J., assignor to Allied Chemical & Dye Corporation, New York, N. Y., a corporation of New York No Drawing. Application February 14, 1952,
Serial No. 271,649

3 Claims. (Cl. 260—669)

This invention relates to process of dehydrating a methyl aryl carbinol, whereby the corresponding aryl vinyl compound is formed, in accordance with the general scheme:

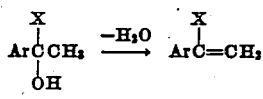

where Ar is an aryl radical and X is hydrogen, methyl or aryl.

Such dehydration has been effected by passing the methyl aryl carbinol, specifically a dimethyl phenyl carbinol, in vapor phase over a solid catalyst, such as activated alumina having large surface area at which the reaction occurs; or in liquid phase using strong mineral acid catalysts such as sulfuric, phosphoric, etc. Such processes have inherent drawbacks including necessity of vaporizing the carbinol and/or recovering high boiling acid catalyst; tendency of these catalysts to induce dimerization or polymerization of the desired vinyl products; etc. In my process, as will be seen from the more detailed discussion which follows, dehydration is effected in the liquid phase by action of small quantities of volatile catalytic substance.

I have now discovered a process for dehydration of dimethyl phenyl carbinols involving only maintaining the carbinol in liquid phase in presence of dissolved sulfur dioxide, which even in minute amounts is a very effective catalyst for dehydration of these specific carbinols, I have found.

My process requires as starting material a compound having the dimethyl phenyl carbinol structure, i. e. having a hydroxy-bearing carbon atom linked to two methyl radicals and one phenyl radical; but the particular phenyl radical attached to the hydroxy-bearing carbon can vary freely so long as the compound is free of substituents entering into reaction with the sulfur dioxide catalyst under dehydration reaction conditions. The hydrogen atoms in the phenyl ring can be replaced, e. g. by alkyl, arylalkyl, halo alkyl, etc. radicals and by halogen, hydroxy, etc., all such aromatic rings being included in the term "phenyl" as employed herein. The fact that my process does not require vaporizing the carbinol gives my process special advantage for dehydrating complex, high-boiling methyl aryl carbinols. Specific methyl aryl carbinols to which my process is applicable are dimethyl phenyl carbinol; dimethyl p-methylphenyl carbinol; the dimethyl chlorophenyl carbinols; the dimethyl dichlorophenyl carbinols; etc.

Among conditions which can be interadjusted to obtain optimum results in accordance with my process are temperatures, pressures, concentrations of carbinol in any solvent used, concentrations of sulfur dioxide catalyst, concentrations of impurities which may be introduced along with the reactants such as parent hydrocarbon of the carbinol or by-products, and concentrations of the products (i. e. vinyl compound and water). Higher temperatures and higher carbinol and sulfur dioxide concentrations lead to more rapid conversions of carbinols to the corresponding vinyl compounds, but may result in greater extent of undesired reactions such as condensation, polymerization, etc. Presence of parent hydrocarbon and of water tends to slow down the dehydration reaction, but presence of water is frequently desirable since it tends to slow down reactions involving the vinyl compound product, such as dimerization, more than it slows the dehydration reaction. It will be seen from the foregoing that conditions for good rseults can be varied widely since any changes in conditions can be at least partially counterbalanced by corresponding changes in other conditions.

Precise ranges of conditions which give optimum results vary depending upon the particular carbinol employed as a reactant. The conditions involve use of temperatures and pressures at which the reaction mixture is liquid, preferably elevated temperatures, in the range between about 100° C. and the boiling point of the reaction mixture under the pressure being used; and presence of sulfur dioxide in amounts ranging from trace amounts up to the saturation point of the liquid reaction mixture, preferably small amounts, to minimize side reactions including reactions of bisulfite ion with the vinyl products. Preferred quantities of sulfur dioxide are in the range between about 50 and about 5000 parts per million parts by weight of carbinol starting material.

Pressures can be atmospheric or lower or higher; when water is present superatmospheric pressures are frequently desirable, to allow operation above 100° C.

To avoid reactions which may be undesired, such as dimerization of the vinyl compound product, it is usually advisable to terminate exposure of the vinyl compound product to reaction conditions at least within a reasonable time after the dehydration is complete or substantially so.

Conventional polymerization inhibitors can be maintained present in the reaction mixture to minimize polymerization of vinyl product.

The vinyl compound product can be separated from the reaction mixture after the dehydration is substantially complete or can be separated continuously as the reaction proceeds, e. g. by distilling it out, suitably as its aqueous azeotrope under atmospheric or superatmospheric pressure.

Sulfur dioxide distills out of the reaction mixture together with water. Aqueous condensate containing sulfur dioxide can be separated from any organic layer and recycled to the reaction zone to provide catalyst therein.

Specific conditions suitable for use in my process are illustrated in the example which follows, showing conversion of dimethyl phenyl carbinol to alpha-methyl styrene. The process is not to be understood as limited by the details of the example, however; nor confined exclusively to the dimethyl phenyl carbinol of the example.

Example 1.—A sample of crude oxidation products obtained from air oxidation of cumene in presence of lead dioxide as a catalyst and containing 90 percent of dimethyl phenyl carbinol, 7 percent of acetophenone and 3 percent of unreacted cumene was maintained at 110° C. after addition of 0.2 percent by weight of sulfur dioxide. After 30 minutes, the products contained 61 percent of alpha-methyl styrene, 26 percent of dimethyl phenyl carbinol, 7 percent of acetophenone and 3 percent of cumene. After 90 minutes, they contained 83 percent of alpha-methyl styrene, 7 percent of acetophenone, 3 percent of cumene, 7 percent of an unidentified compound, no dimethyl phenyl carbinol and no alpha-methyl styrene dimer. After 120 minutes, they contained 70 percent of alpha-methyl styrene, 7 percent of acetophenone, 3 percent of cumene, 10 percent of an unidentified compound, 10 percent of alpha-methyl styrene dimer and no dimethyl phenyl carbinol.

I claim:

1. Process for dehydrating a dimethyl phenyl carbinol free of substituents entering into reaction with sulfur dioxide during the dehydration process which process comprises maintaining said carbinol in liquid phase in presence of dissolved sulfur dioxide.

2. Process as defined in claim 1 wherein temperatures are in the range between about 100° C. and the boiling point of the reaction mixture at the prevailing pressure; and sulfur dioxide is present in amounts between about 50 and about 5000 parts per million parts by weight of the dimethyl phenyl carbinol starting material.

3. Process as defined in claim 2 wherein the starting material is unsubstituted dimethyl phenyl carbinol.

References Cited in the file of this patent

UNITED STATES PATENTS

| | | |
|---|---|---|
| 2,345,625 | Palmer et al. | Apr. 4, 1944 |
| 2,433,077 | Dussolier | Dec. 23, 1947 |
| 2,542,551 | McKeever et al. | Feb. 20, 1951 |
| 2,588,123 | Kern | Mar. 4, 1952 |

OTHER REFERENCES

Quelet: Chem. Abst., vol. 23 (1929), page 3908 (1 page only).